(12) United States Patent
Oaten

(10) Patent No.: US 8,221,200 B2
(45) Date of Patent: Jul. 17, 2012

(54) ROOF ASSEMBLY

(76) Inventor: Terrence Robert Oaten, Melbourne (AU)

(*) Notice: Subject to any disclaimer, the term of this patent is extended or adjusted under 35 U.S.C. 154(b) by 0 days.

(21) Appl. No.: 11/833,145

(22) Filed: Aug. 2, 2007

(65) Prior Publication Data

US 2008/0163576 A1 Jul. 10, 2008

Related U.S. Application Data

(63) Continuation of application No. PCT/AU2006/000146, filed on Feb. 6, 2006.

(30) Foreign Application Priority Data

Feb. 4, 2005 (AU) ............................. 2005900509

(51) Int. Cl.
*E04D 13/17* (2006.01)
*E04B 7/00* (2006.01)

(52) U.S. Cl. ........ 454/186; 454/185; 454/260; 454/365; 454/367; 454/368; 52/95

(58) Field of Classification Search ............... 454/365; 52/199
See application file for complete search history.

(56) References Cited

U.S. PATENT DOCUMENTS

| | | | | |
|---|---|---|---|---|
| 3,677,229 A | * | 7/1972 | Blough et al. | 119/448 |
| 5,561,953 A | * | 10/1996 | Rotter | 52/198 |
| 6,185,880 B1 | * | 2/2001 | Richardson | 52/198 |
| 6,491,579 B1 | * | 12/2002 | O'Hagin | 454/250 |
| 6,780,099 B1 | * | 8/2004 | Harper | 454/186 |
| 7,231,744 B2 | * | 6/2007 | Cooper et al. | 52/199 |
| 2003/0126806 A1 | | 7/2003 | Ellis | 52/95 |

FOREIGN PATENT DOCUMENTS

| | | |
|---|---|---|
| CN | 2048087 U | 11/1989 |
| DE | 3311152 A1 | 9/1984 |
| DE | 3801199 A1 | 7/1989 |
| DE | 3933734 A1 | 4/1991 |
| FR | 2293672 | 7/1976 |
| GB | 2047319 A | 11/1980 |
| JP | 1068178 | 3/1998 |
| JP | 2000146222 A | 5/2000 |

OTHER PUBLICATIONS

International Search Report, PCT/AU2006/000146 (Mar. 9, 2006) pp. 3.
U.S. Appl. No. 60/586,692, filed Jul. 8, 2004.

* cited by examiner

*Primary Examiner* — Steven B McAllister
*Assistant Examiner* — Helena Kosanovic
(74) *Attorney, Agent, or Firm* — Nixon Peabody LLP

(57) ABSTRACT

A roof assembly for a building which includes a roof, a roof space in heat exchange relationship with at least a section of the roof, and at least one opening for airflow from the roof space.

21 Claims, 4 Drawing Sheets

ROOF ASSEMBLY

RELATED APPLICATIONS

This application is a continuation of International Application No. PCT/AU2006/000146, filed on Feb. 6, 2006, which designates the United States and which published in English as International Publication No. WO/2006/081630, and which claims priority to Australian Application No. 2005900509 filed on Feb. 4, 2005.

BACKGROUND OF THE INVENTION

The present invention relates to a roof assembly for a building. The present invention also relates to a building that includes a roof assembly.

SUMMARY OF THE INVENTION

The present invention relates particularly to transferring heat from within a roof space of a building to outside the building or to a living space in the building, depending on whether the building is exposed to "summer" or "winter" conditions.

The term "summer" conditions is understood herein to mean that the temperature outside a building is higher than what would be regarded as a comfortable temperature in the living space of the building.

The term "winter" conditions is understood herein to mean that the temperature outside a building is lower than what would be regarded as a comfortable temperature in the living space of the building.

The nature of heat loss and heat gain within buildings is a complex relationship that is dependent on a number of factors including, by way of example, orientation of buildings, climatic conditions, building materials, building design, ventilation, and internal loads on buildings.

There is an increasing recognition that the use of air conditioning to artificially heat or cool buildings is costly in terms of capital and operating costs and is an environmental issue in terms of the use of fossil fuels.

Coincidentally, there is increasing interest in minimising the artificial heating and cooling requirements for new and existing buildings.

The present invention provides such a means for minimising the artificial heating and cooling requirements for new and existing buildings.

The present invention relates particularly, although by no means exclusively, to a roof assembly that includes a roof that is made at least in part from metal.

The metal roof may be metal sheets that have been formed, for example by being roll-formed, from painted or unpainted steel strip into profiles that include corrugations or include flat pans separated by open or closed ribs.

By way of further example, the metal roof may also be metal tiles that have been formed, for example by being pressed, into a tile shape and include corrugations and/or ribs as part of the tile shape.

The present invention relates particularly, although by no means exclusively, to a roof assembly that includes a roof that has at least an inclined roof section that is made from the above-described metal sheets and/or metal tiles arranged in overlapping relationship with the corrugations and/or the ribs extending up the inclined surface of the roof section.

In the context of the roof assembly described in the preceding paragraph, the present invention provides a roof assembly that takes advantage of the corrugations and/or the ribs of the metal roof sheets and/or tiles by using the corrugations and/or the ribs as channels for airflow in heat exchange relationship with the metal of the roof. Specifically, in the context of the roof assembly described in the preceding paragraph, the arrangement of metal roof sheets and/or tiles in the present invention is such that, in use, air in the corrugations and/or the ribs is heated by heat exchange with the metal of the roof and flows along the channels defined by the corrugations and/or the ribs and thereafter flows either (a) from the building altogether, and thereby cools the building by removing heat from the building, or (b) into a living space of the building, and thereby heats the living space.

The air flow may be derived from air within the roof space.

Alternatively, or in addition, the air flow may be derived from air from the exterior of the building that flows into the corrugations and/or the ribs, for example from a gutter end of the roof.

In such a situation, preferably the roof assembly includes a barrier, such as insulation in sheet form, within the roof space that is positioned against the corrugations and/or the ribs so that airflow is confined to the corrugations and/or the ribs. In such a situation, in the context of the present invention, the "roof space" is the space defined by the corrugations and/or the ribs and the barrier.

In general terms, the present invention provides a roof assembly for a building which includes a roof, a roof space in heat exchange relationship with at least a section of the roof, and at least one opening for airflow from the roof space.

With the above-described arrangement, airflow within the roof space is heated by heat exchange with the roof section or sections and the heated air flows from the roof space via the opening or openings.

The roof assembly may include one or more than one first opening for airflow from the roof space to outside the building altogether to cool the building in "summer" conditions.

The roof assembly may include one or more than one second opening for airflow from the roof space to a living space of the building (a) to heat the living space in "winter" conditions or (b) to cool the living space in "summer" conditions when the outside air temperature or the roof temperature is lower than the inside temperature, for example as may be the case overnight.

In addition to allowing airflow from the roof space to the living space in "winter" and "summer" conditions, preferably the second opening is adapted to allow airflow from the living space to the roof space and, more preferably, thereafter to outside the building in "summer" conditions when the outside air temperature or the roof temperature is lower than the inside temperature, for example as may be the case overnight.

Preferably the roof assembly includes at least one first opening and at least one second opening so that the roof assembly can function to cool and to heat the building depending on the conditions.

Preferably the roof assembly includes a means for causing airflow within the roof space in heat exchange relationship with the roof to the opening or openings.

The present invention relies on movement of air within the roof space in heat exchange relationship with the roof section or sections and ultimately from the roof space.

Such movement may be the result of natural upward movement of heated air in the case of an inclined roof.

Preferably the movement in inclined and flat roofs is promoted by the use of a specific means for causing airflow.

Preferably the airflow means includes at least one fan for causing airflow within the roof space to the opening or openings.

Preferably the fan is a solar-powered fan.

As is indicated above, the air flow may be derived from air within the roof space and/or from air from the exterior of the building that flows into the corrugations and/or the ribs, for example from a gutter end of the roof.

Preferably the roof section is made from metal sheets that are arranged in side by side, more preferably overlapping, relationship.

Preferably the metal sheets are formed, for example by being roll-formed, from painted or unpainted steel strip and include profiles that include corrugations or include flat pans separated by ribs.

Preferably the roof section is an inclined roof section and is made from the metal sheets described in the preceding paragraph arranged in side by side, more preferably overlapping, relationship with the corrugations and/or the ribs extending up the inclined surface of the roof section.

The roof section may also be made advantageously from metal tiles that are arranged in overlapping relationship.

In that event, preferably the metal tiles are formed, for example by being pressed, and include corrugations and/or ribs.

Moreover, in that event, preferably the roof section is an inclined roof section and is made from metal tiles described in the preceding paragraph in overlapping relationship with the corrugations and/or the ribs extending up the inclined surface of the roof section.

Preferably the corrugations and/or the ribs of the metal roof sheets and tiles define channels for airflow within the roof space in heat exchange relationship with the metal of the roof section.

Preferably the roof assembly includes a chamber that includes one or more than one inlet for airflow from the roof space and the above described airflow opening or openings for airflow from the roof space.

In a situation in which the roof is an inclined roof, preferably the chamber is located at or proximate an upper end of the inclined roof section.

The inclined roof section may be part of any suitable roof.

For example, the inclined roof section may be part of an A-frame roof that includes a ridge cap and roof sections extending outwardly and downwardly from opposite sides of the ridge cap.

Specifically, the inclined roof section may be a part or whole of one or both A-frame roof sections.

Preferably the ridge cap defines a channel for airflow within the roof space.

With this arrangement, preferably the channels that are defined by the corrugations and/or the ribs of the metal sheets and tiles open into the ridge cap channel so that air can flow along the corrugations and/or the ribs to the ridge cap channel and thereafter along the ridge cap channel to the opening or openings.

With this arrangement, preferably the opening chamber is positioned in a section of the ridge that separates two sections of the ridge cap.

According to the present invention there is also provided an apparatus for cooling or heating a building that includes the above-described (a) air space for airflow, (b) the chamber, and (c) the openings for airflow from the roof space.

According to the present invention there is also provided a building that includes the above-described roof assembly.

The present invention is described further by way of example with reference to the accompanying drawings of which:

DETAILED DESCRIPTION OF THE INVENTION

Figure 1:
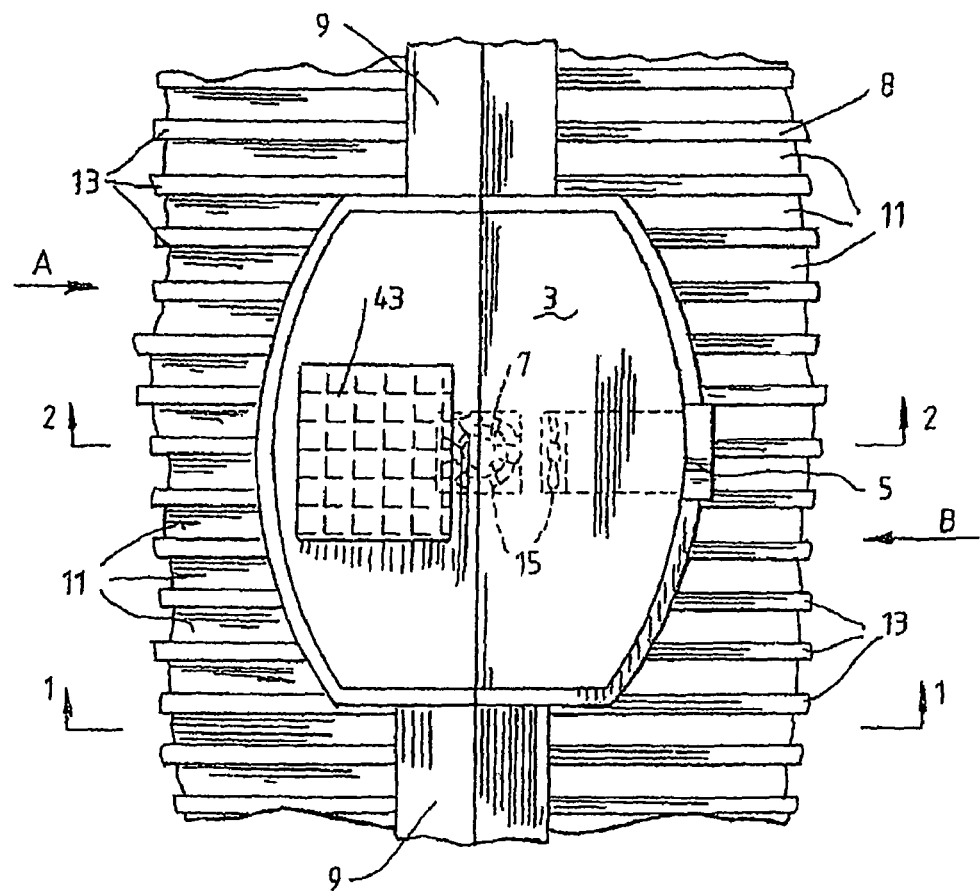
FIG. 1 is a top plan view of part of one embodiment of a roof assembly in accordance with the present invention that illustrates an opening chamber and airflow openings of the roof assembly.

The roof assembly shown in the Figures forms part of a building and includes:

(a) a roof that is a basic A-frame having a ridge cap 9 and a pair of roof sections 8 that extend outwardly and downwardly from opposite sides of the ridge cap 9 and are supported on an assembly of purlins 23 and battens 25;

(b) a roof space 2 in heat exchange relationship with the roof sections 8; and (c) a chamber 3 that is positioned on the ridge of the roof and, in effect, divides the ridge cap 9 into two sections that extend from opposite ends of the chamber 3, and has (i) inlets (some of which are identified by the numeral 71 in FIGS. 5 and 6) for airflow from the roof space 2 into the chamber 3, (ii) an opening 5 for airflow from the chamber 3 to the outside of the building and vice versa, (iii) a baffle 12 that can be selectively actuated to open or close the opening 5, (iv) an opening 7 for airflow from the chamber 3 to a living space 41 of the building or vice versa, and (v) a baffle 12 that can be selectively actuated to open or close the opening 7.

The roof sections 8 are made from metal sheets that have been roll-formed from painted or unpainted steel strip into profiles that have flat pans 11 separated by open parallel ribs 13 that extend from the pans 11 along the lengths of the sheets. The metal sheets are arranged in side by side overlapping relationship with the ribs 13 extending up the inclined surfaces of the roof sections 8.

The ribs 13 of the metal sheets of the inclined roof sections 8 define channels for airflow in the roof space 2 in heat exchange relationship with the metal of the metal sheets.

Figure 7:
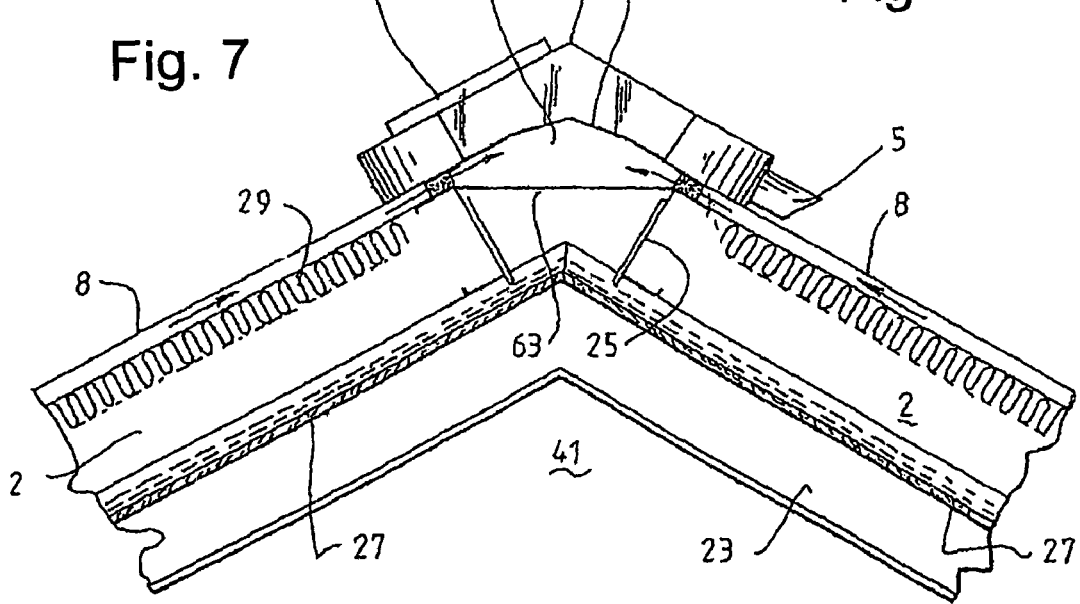
FIG. 7 is a section along the line 1-1 of FIG. 1.
Figure 2:
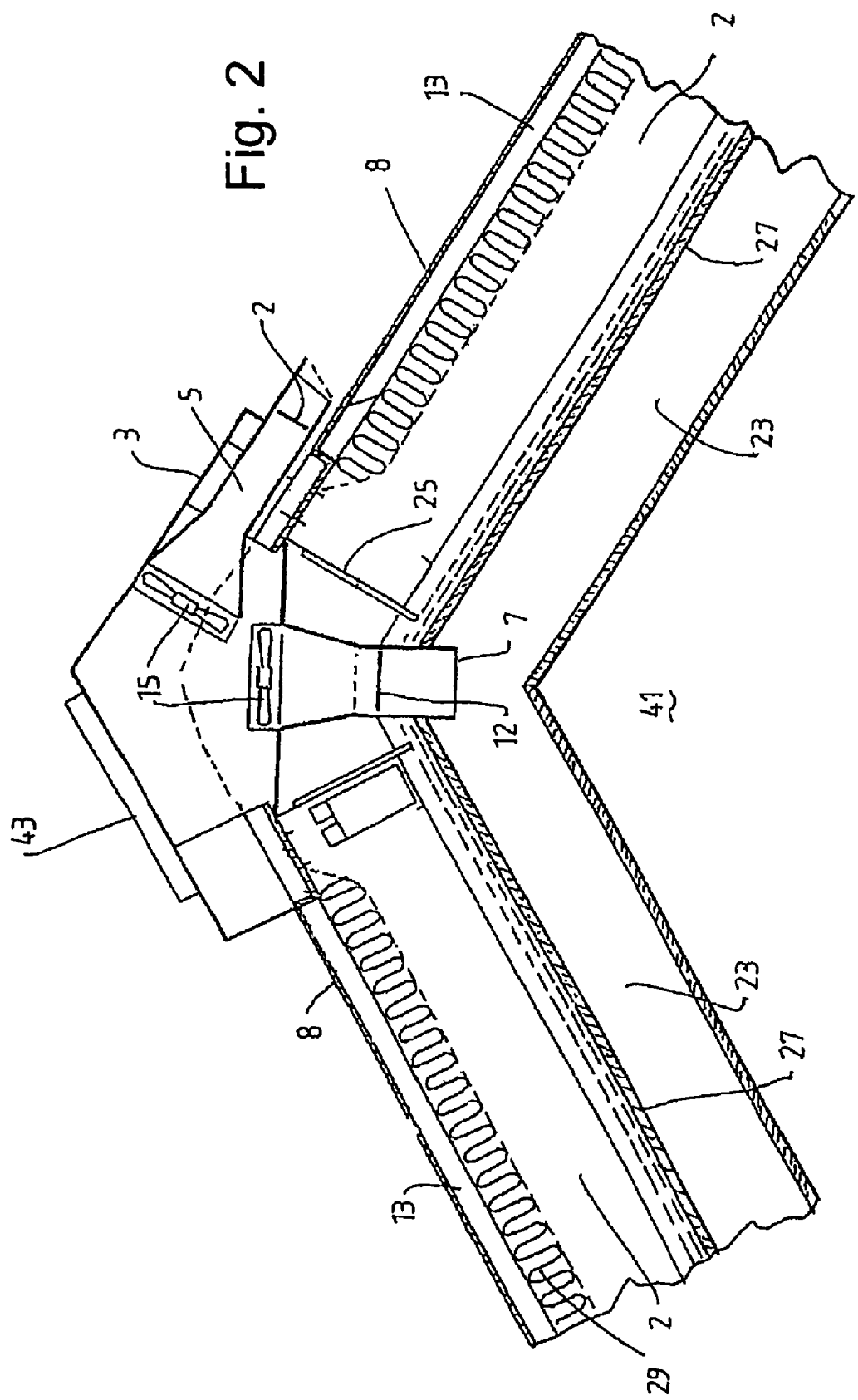
FIG. 2 is a vertical section along the line 2-2 of FIG. 1.
Figure 3:
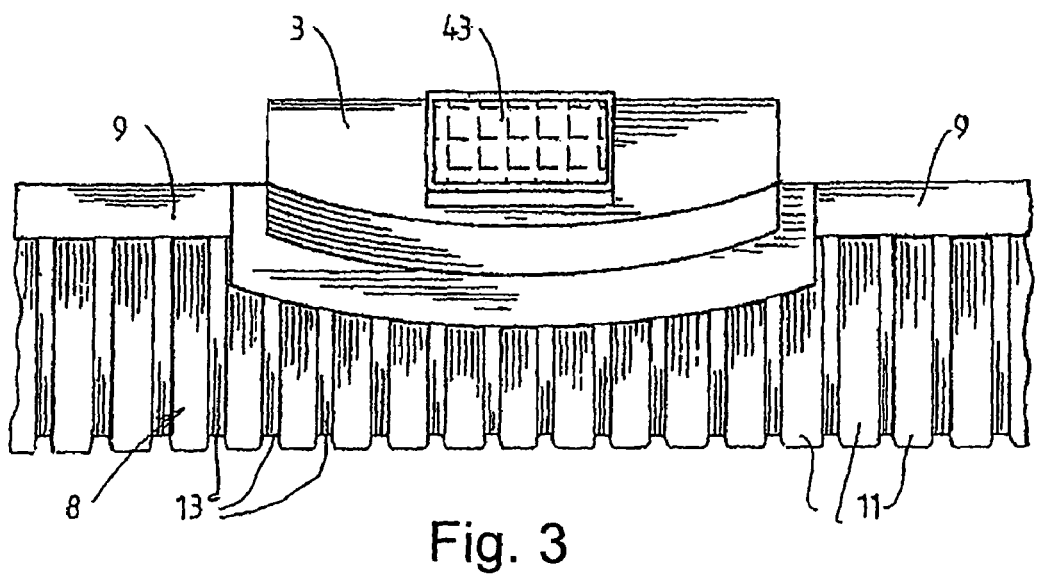
FIG. 3 is a side elevation of the roof assembly as shown in FIG. 1 in the direction of the arrow A in FIG. 1.
Figure 4:
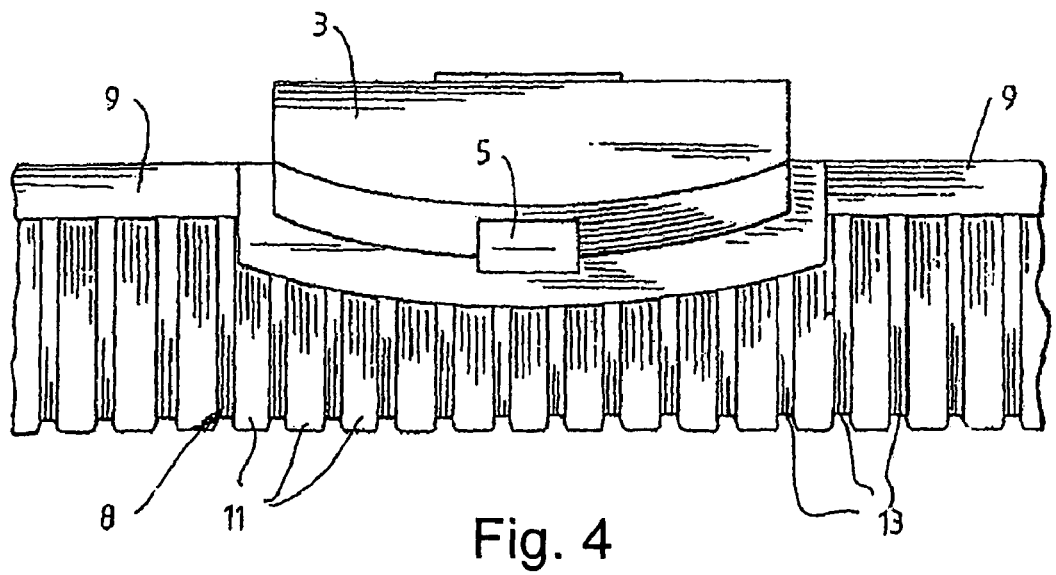
FIG. 4 is a side elevation of the roof assembly as shown in FIG. 1 in the direction of the arrow B in FIG. 1.

As is indicated above, the ridge cap 9 has two sections that extend from opposite ends of the opening chamber 3. As can best be seen in FIG. 7, the sections of the ridge cap 9 define channels 61 for airflow from the roof space 2 along the ridge cap 9 towards the inner ends of the ridge cap sections and into the chamber 3.

The airflow into the channels 61 is via the airflow channels defined by the ribs 13 in the roof sections 8.

The outer ends (not shown) of the ridge cap 9 are closed to prevent airflow from these ends. In addition, the ridge cap 9 includes a metal sheet 63 (FIG. 7) that defines a lower wall of the channel 61 and thereby further seals the channels 61. The metal sheet 63 is positioned to extend between upper ends of the metal roof sheets. In addition, the roof includes closed polyurethane strips and silicone sealer to close openings defined by the upper ends of the metal roof sheets and edges of the ridge cap 9 that, otherwise, would allow airflow outwardly from the channels 61.

Figure 5:
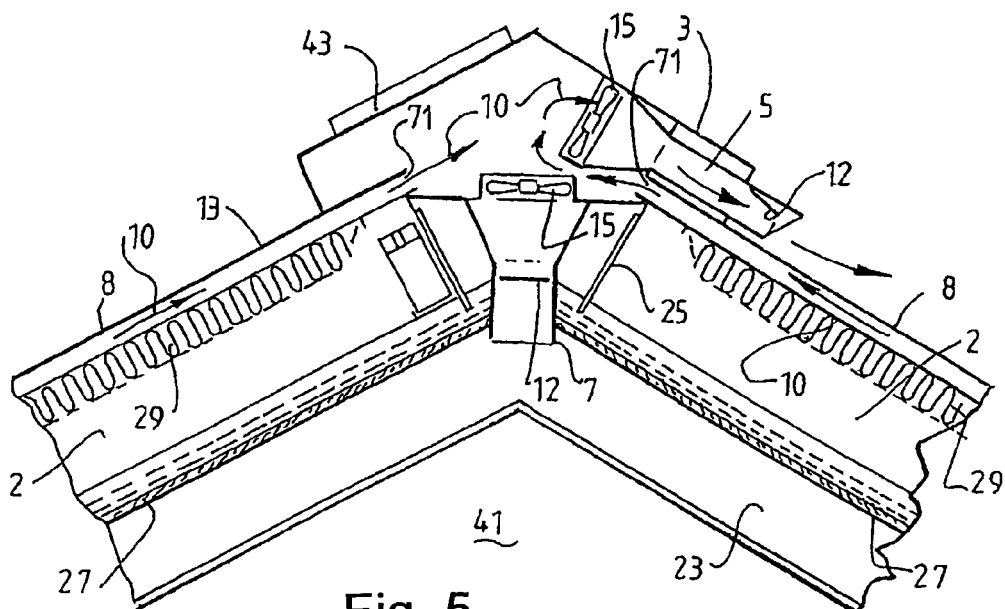
FIG. 5 is the vertical section shown in FIG. 2 with a series of arrows that illustrate the directions of airflow in the roof assembly in "summer" conditions in which the air temperature within the roof space in heat exchange relationship with the roof shown in the Figure is higher than the temperature inside the building.
Figure 6:
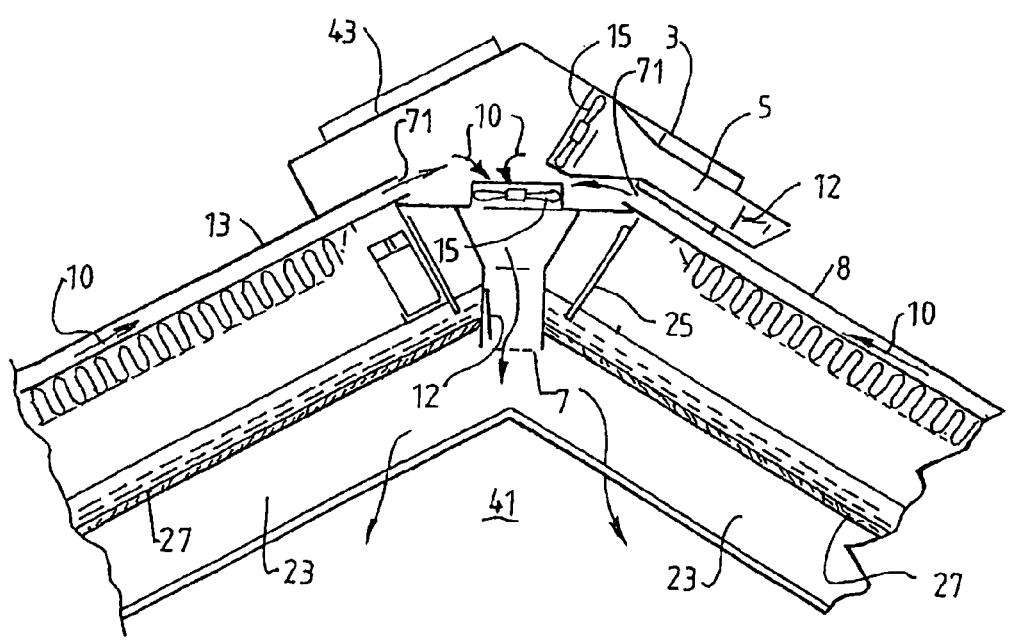
FIG. 6 is the vertical section shown in FIG. 2 with a series of arrows that illustrate the directions of airflow in the roof assembly in "winter" conditions when the air temperature within the roof space in heat exchange relationship with the roof shown in the Figure is higher than the temperature inside the building.

As can best be seen in FIGS. 5 and 6, the metal sheets of the inclined roof sections 8 that are on opposite sides of the chamber 3 are arranged so that the upper ends of the ribs 13 of these metal sheets open into inlets 71 in the sides of the chamber 3. Thus, these ribs 13 define channels for airflow from the roof space 2 directly into the chamber 3.

The roof also includes a plasterboard ceiling 27 that defines a lower wall of the roof space 2.

The roof also includes at least one layer of insulation 29 positioned against the metal roof sheets. The insulation contributes to forming airflow channels in heat exchange relationship with the metal sheets of the roof.

As is described above, the ribs 13 of the metal roof sheets and the ridge cap 9 define a series of channels for airflow within the roof space 2. The arrangement is such that air can flow upwardly along the channels defined by the ribs 13 (a) directly into the chamber 3 or (b) into the channels 61 defined by the ridge cap sections and along the ridge cap channels 61 into the chamber 3 and the openings 5, 7 of the chamber 3.

The roof assembly also includes two fans 15 that are operable to cause airflow within the roof assembly.

The fans 15 are solar powered via a solar cell array 43.

As can best be seen in FIG. 5, during "summer" conditions, with the baffles 12 in the opening 5 in open position and the baffle 12 in the opening 7 in a closed position, the fans 15 are operated to cause airflow of hot air from the roof space 2 into the chamber 3 and from the chamber through the opening 5 to outside the building.

In particular, the fans 15 cause air to move through the channels defined by the ribs 13 and the moving air is heated via heat exchange with the metal roof sheets and the heated air flows into the chamber 3 and from the chamber through the opening 5. Thus, the airflow moving through the roof space 2 removes heat from the building that otherwise ultimately would heat the living space 41 of the building. More specifically, the air space 2, and particularly moving air passing through the roof space 2, increases the thermal resistance of the roof assembly.

As can best be seen in FIG. 6, during "winter" conditions, with the baffle 12 in the opening 5 in a closed position and the baffle 12 in the opening 7 in an open position, the fans 15 are operated to cause airflow from the roof space 2 to the chamber 3 and from the chamber through the opening 7 into the living space 41.

In particular, the fans 15 cause air to move through the channels defined by the ribs 13 and the moving air is heated via heat exchange with the metal roof sheets and the heated air flows via the chamber 3 and the opening 7 into the living space 41 and heats the space.

The applicant has carried out experimental work on the above-described embodiment of the roof assembly during "summer" and "winter" conditions and found that the assembly made a significant impact on the temperature within the living space 41 in both conditions. The experimental work included monitoring the temperatures within a chamber 3, outside the building, and in the living space in the building during "summer" and "winter" conditions.

In particular, the experimental work found that during "summer" conditions the roof assembly (a) cooled the building during daytime by extracting heat from the roof space 2 and (b) cooled the building during nightime, particularly during the cooler early morning, by supplying air that had been cooled by heat exchange with the metal roof sections that were below the inside temperatures at that time.

The above-described roof assembly is a straightforward construction that makes use of standard building elements, such as metal roof sheets.

In addition, the above-described roof assembly can be constructed without difficulty by modifying an existing roof assembly.

Many modifications may be made to the embodiment of the invention described above without departing from the spirit and scope of the invention.

By way of example, whilst the embodiment shown in the Figures is an A-frame roof with a ridge cap and roof sections 8 that extend outwardly and downwardly from opposite sides of the ridge, the present invention is not so limited and extends to any suitable roof. By way of example, another suitable roof is a metal sheet roof that includes highlight windows.

By way of further example, whilst the embodiment shown in the Figures has a single chamber 3, the present invention is not so limited and extends to arrangements that have more than one chamber 3.

By way of further example, whilst the embodiment shown in the Figures has roof sections 8 that are made from metal sheets that have been roll-formed from painted or unpainted steel strip, the present invention is not so limited and extends to arrangements that have roof sections 8 made from any suitable materials.

By way of further example, whilst the embodiment shown in the Figures has roof sections 8 that are made from metal sheets, the present invention is not so limited and extends to roof sections made from metal tiles that have been formed, for example by being pressed, into a tile shape and include corrugations and/or ribs as part of the tile shape.

By way of further example, whilst the embodiment shown in the Figures has inclined roof sections 8, the present invention is not so limited and extends to flat roofs.

What is claimed is:

1. A roof assembly for a building, comprising:
    a roof;
    a roof space in heat exchange relationship with at least a section of the roof;
    a chamber device positioned on the roof, the chamber device including one or more first openings configured to allow airflow from within the roof space to outside the building to cool the building and one or more second openings configured to allow airflow from within the roof space to a living space of the building to heat the living space or cool the living space depending on temperatures inside and outside of the building, wherein the one or more first and second openings are selectively openable and closeable to control airflow through at least one opened openings; and
    a plurality of fans in the chamber device for selectively causing airflow within the roof space to the one or more first and second openings, wherein at least one of the plurality of fans is a solar-powered fan.

2. The roof assembly defined in claim 1, wherein the roof section comprises metal sheets or metal tiles that are arranged in side by side relationship.

3. The roof assembly defined in claim 2, wherein the metal sheets are formed from painted or unpainted steel strip and include profiles that include corrugations or ribs.

4. The roof assembly defined in claim 3, wherein the roof section is inclined and the corrugations or the ribs extend up the incline of the roof section.

5. The roof assembly defined in claim 3, wherein the corrugations, or the ribs of the metal roof sheets define channels for airflow within the roof space.

6. The roof assembly defined in claim 5, further comprising an insulating barrier that is positioned against the corrugations or the ribs so that air flow is confined to the channels formed between the corrugations or the ribs and the insulating barrier.

7. The roof assembly defined in claim 1, wherein the roof section is an inclined roof section, and the chamber is located proximate to an upper end of the inclined roof section.

8. The roof assembly defined in claim 1, wherein the roof section is part of an A-frame roof that includes a ridge cap and roof sections extending outwardly and downwardly from opposite sides of the ridge cap.

9. The roof assembly defined in claim 8, wherein the ridge cap defines a channel for airflow.

10. The roof assembly defined in claim 5, wherein the channels defined by the corrugations or the ribs of the metal sheets open into the ridge cap channel so that air can flow to the ridge cap channel and along the ridge cap channel to the first or the second openings.

11. A building comprising the roof assembly defined in claim 1.

12. The roof assembly defined in claim 2 wherein the metal tiles include corrugations or ribs.

13. The roof assembly defined in claim 5 wherein the corrugations or ribs of the metal tiles define channels for airflow within the roof space.

14. The roof assembly defined in claim 6 wherein the channels defined by the corrugations and the ribs of the metal tiles open into the ridge channel so that air can flow along the corrugations and the ribs to the ridge cap channel and along the ridge cap channel to the first and second openings.

15. The roof assembly defined in claim 1 further comprising:
a first valve within at least one of the one or more first openings;
a second valve within at least one of the one or more second openings, wherein the first and second valves are selectively opened and closed to selectively control airflow through the first or second openings.

16. The roof assembly defined in claim 2, wherein the metal sheets are formed from painted or unpainted steel strip and include profiles that include corrugations and ribs.

17. A roof assembly for a building, comprising:
a roof;
a roof space in heat exchange relationship with at least a section of the roof;
a chamber device positioned on the roof, the chamber device including one or more first openings configured to allow airflow from within the roof space to outside the building to cool the building and one or more second openings configured to allow airflow from within the roof space to a living space of the building to heat the living space or cool the living space depending on temperatures inside and outside of the building, wherein the one or more first and second openings are selectively openable and closeable to control airflow through at least one opened openings;
a plurality of fans in the chamber device for selectively causing airflow within the roof space to the one or more first and second openings; and
at least one duct leading from the chamber device to outside the building or to an interior of the building through which the airflow is selectively directed.

18. The roof assembly defined in claim 17, wherein the roof section is an inclined roof section, and the chamber is located proximate to an upper end of the inclined roof section.

19. The roof assembly defined in claim 17, wherein the roof section is part of an A-frame roof that includes a ridge cap and roof sections extending outwardly and downwardly from opposite sides of the ridge cap.

20. The roof assembly defined in claim 8, wherein the ridge cap defines a channel for airflow.

21. The roof assembly defined in claim 17 further comprising:
a first valve within at least one of the one or more first openings;
a second valve within at least one of the one or more second openings, wherein the first and second valves are selectively opened and closed to selectively control airflow through the first or second openings.

* * * * *